(12) United States Patent
Kida et al.

(10) Patent No.: US 9,587,122 B2
(45) Date of Patent: *Mar. 7, 2017

(54) ULTRAVIOLET-CURABLE INK JET COMPOSITION AND STORAGE BODY THEREOF

(71) Applicant: Seiko Epson Corporation, Tokyo (JP)

(72) Inventors: Hiroaki Kida, Shiojiri (JP); Tetsuya Aoyama, Shiojiri (JP); Keitaro Nakano, Matsumoto (JP); Hitoshi Tsuchiya, Chino (JP); Toshiyuki Yoda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,312

(22) Filed: Feb. 2, 2016

(65) Prior Publication Data

US 2016/0160062 A1 Jun. 9, 2016

Related U.S. Application Data

(62) Division of application No. 14/682,617, filed on Apr. 9, 2015, now Pat. No. 9,260,618.

(30) Foreign Application Priority Data

Apr. 11, 2014 (JP) .................................. 2014-082334

(51) Int. Cl.
*C09D 11/101* (2014.01)
*C09D 11/322* (2014.01)
(Continued)

(52) U.S. Cl.
CPC ......... *C09D 11/101* (2013.01); *B41J 2/17513* (2013.01); *B41J 2/17553* (2013.01); *C09D 11/322* (2013.01); *B41J 2/175* (2013.01); *B41J 2/17503* (2013.01); *B41J 2/211* (2013.01); *C09D 11/36* (2013.01); *C09D 11/40* (2013.01)

(58) Field of Classification Search
CPC ..... C09D 11/322; C09D 11/107; C09D 11/36; C09D 11/40; C09D 11/30; C09D 11/38; B41J 2/211; B41J 2/175; B41J 2/17503; B41J 2/2114

See application file for complete search history.

(56) References Cited

U.S. PATENT DOCUMENTS 9,260,618 B2 * 2/2016 Kida .................... C09D 11/101
2013/0307913 A1 11/2013 Kawashima et al.
(Continued)

FOREIGN PATENT DOCUMENTS

JP 2005-200560 A 7/2005

*Primary Examiner* — Henock Legesse
(74) *Attorney, Agent, or Firm* — Nutter McClennen & Fish LLP; John J. Penny, Jr.; Alex Nagorniy

(57) ABSTRACT

There is provided an ultraviolet-curable ink jet composition, which is stored in an storage body, including a pigment; a pigment dispersant; a polymerizable compound; and a photopolymerization initiator, in which water content is 0.05 mass % to 1.0 mass % based on the total amount of the ultraviolet-curable ink jet composition, and in which both the acid value and the amine value of the pigment dispersant are 50 mgKOH/g or less, and at least one of the acid value and the amine value thereof is 10 mgKOH/g or more.

13 Claims, 1 Drawing Sheet

(51) Int. Cl.
*B41J 2/175* (2006.01)
*C09D 11/36* (2014.01)
*B41J 2/21* (2006.01)
*C09D 11/40* (2014.01)

(56) References Cited

U.S. PATENT DOCUMENTS

2015/0266308 A1  9/2015  Aoyama et al.
2015/0291818 A1  10/2015  Kida et al.

* cited by examiner

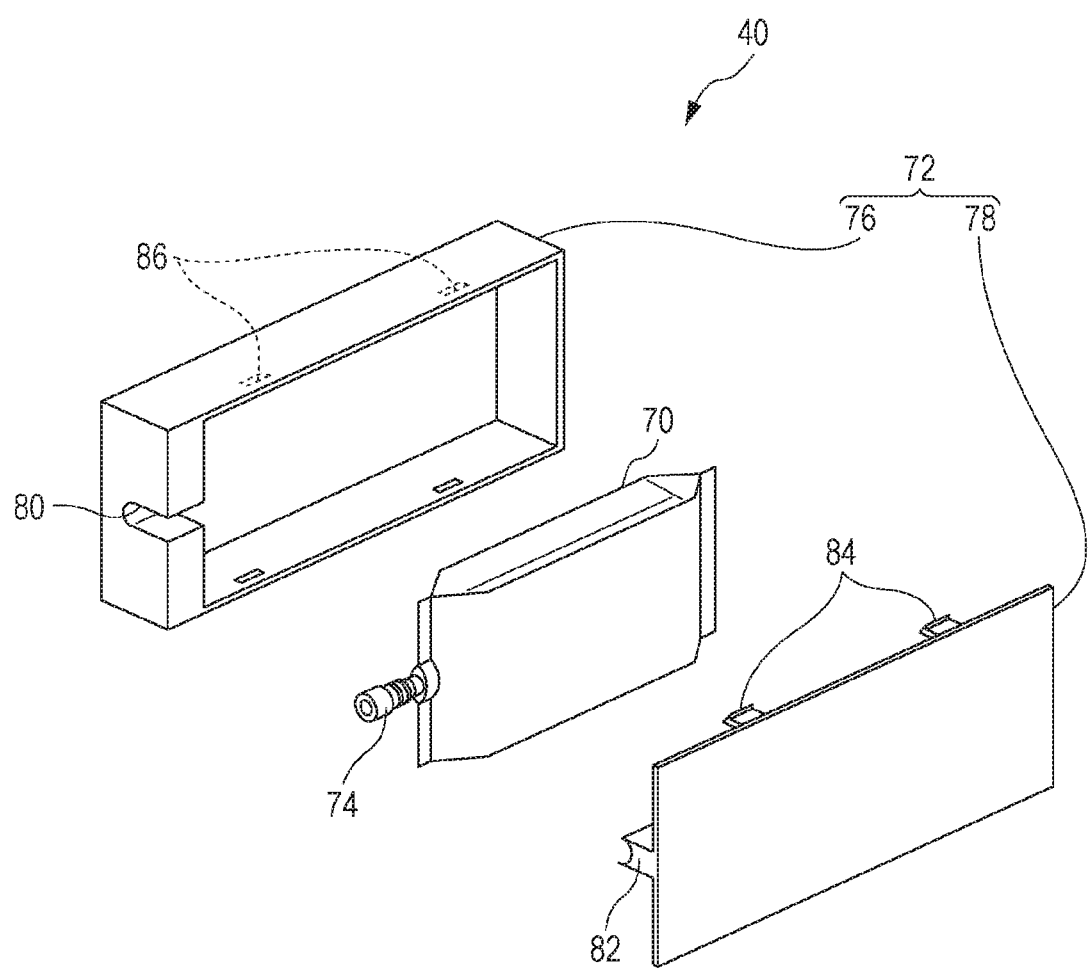

ULTRAVIOLET-CURABLE INK JET COMPOSITION AND STORAGE BODY THEREOF

RELATED APPLICATIONS

The present application is a Divisional of U.S. patent application Ser. No. 14/682,617, filed on Apr. 9, 2015, which claims the benefit and priority, under 35 U.S.C. §119 to Japanese Patent Application No. 2014-082334, filed Apr. 11, 2014. The entire teachings of these applications are incorporated by reference herein.

BACKGROUND

1. Technical Field

The present invention relates to an ultraviolet-curable ink jet composition and a storage body thereof.

2. Related Art

Ink jet recording methods have been rapidly developed in many areas because high-definition images can be recorded by a relatively simple apparatus. Among these methods, various examinations for ink compositions used in an ink jet recording method of curing an ink by ultraviolet irradiation have been conducted. For example, for the purpose of providing an ultraviolet-curable ink jet ink capable of stably landing with high accuracy and having excellent storage stability and curability, JP-A-2005-200560 discloses an ink jet ink composition including at least a pigment, a dispersant having an acid value greater than an amine value, a polymerizable compound, and a photopolymerization initiator, in which the total amount of cationic impurities, metal impurities and strongly acidic substance is 500 ppm or less, and the water content ratio thereof is 1 mass % to 3 mass %.

However, as disclosed in JP-A-2005-200560, when the content of water in the ultraviolet-curable ink jet composition is 1 mass % to 3 mass %, there is a problem in that foreign matter (pigment aggregates) is generated due to the aggregation of a pigment. In addition, when the content of water in the ink jet composition is high, there is a problem in that the curability of the ink jet composition is also lowered. In order to suppress the precipitation of foreign matter and improve the curability of the ink jet composition, it is considered to reduce the content of water in the ultraviolet-curable ink jet composition as much as possible. However, when the water content is excessively reduced, particularly, it takes excessive process and time to remove water from a polymerizable compound, and, as a result, the efficiency of manufacturing the ultraviolet-curable ink jet composition is lowered.

SUMMARY

An advantage of some aspects of the invention is to provide a ultraviolet-curable ink jet composition having excellent curability, capable of suppressing the precipitation of foreign matter, having excellent storage stability and having high manufacturing efficiency, and to provide a storage body storing the composition.

The present inventors have conducted intensive studies. As a result, they have found that the invention can be realized by defining the acid value and amine value of a pigment dispersant contained in an ultraviolet-curable ink jet composition and the content of water contained in the composition within a predetermined range, thus completing the invention.

That is, the invention is as follows.

[1] According to an aspect of the invention, there is provided an ultraviolet-curable ink jet composition, which is stored in a storage body, including a pigment; a pigment dispersant; a polymerizable compound; and a photopolymerization initiator, in which water content is 0.05 mass % to 1.0 mass % based on the total amount of the ultraviolet-curable ink jet composition, and in which both the acid value and the amine value of the pigment dispersant are 50 mgKOH/g or less, and at least one of the acid value and the amine value thereof is 10 mgKOH/g or more.

[2] In the ultraviolet-curable ink jet composition according to [1], the total amount of the acid value and the amine value of the pigment dispersant may be 15 mgKOH/g to 90 mgKOH/g.

[3] The ultraviolet-curable ink jet composition according to [1] or [2] may include a radical polymerizable compound as the polymerizable compound.

[4] The ultraviolet-curable ink jet composition according to any one of [1] to [3] may include an acylphosphine oxide compound as the photopolymerization initiator.

[5] The ultraviolet-curable ink jet composition according to any one of [1] to [4] may include a polymerizable compound having a vinyl ether group and a (meth)acrylate group as the polymerizable compound.

[6] In the ultraviolet-curable ink jet composition according to [5], the polymerizable compound having a vinyl ether group and a (meth)acrylate group may be included in an amount of 10 mass % to 70 mass % based on the total amount of the ultraviolet-curable ink jet composition.

[7] The ultraviolet-curable ink jet composition according to [5] or [6], may include a (meth)acrylic acid ester containing a vinyl ether group represented by General Formula (1) below:

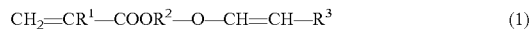

$$CH_2=CR^1-COOR^2-O-CH=CH-R^3 \qquad (1)$$

(here, $R^1$ is a hydrogen atom or a methyl group, $R^2$ is a divalent organic residue of 2 to 20 carbon atoms, and $R^3$ is a hydrogen atom or a monovalent organic residue of 1 to 11 carbon atoms) as the polymerizable compound having a vinyl ether group and a (meth)acrylate group.

[8] In the ultraviolet-curable ink jet composition according to [7], the (meth)acrylic acid ester containing a vinyl ether group may be 2-(vinyloxyethoxy)ethyl acrylate.

[9] According to another aspect of the invention, there is provided a storage body, which stores the ultraviolet-curable ink jet composition according to any one of [1] to [8].

[10] In the storage body according to above [9], the storage body is configured such that a container made of a member having an oxygen permeability of 0.01 cc to 5.0 cc·20 μm/(m²·day·atm) at a temperature of 23° C. and a humidity of 65% is filled with the ultraviolet-curable ink jet composition, or is configured such that at least a container filled with the ultraviolet-curable ink jet composition is sealed with a packing made of a member having an oxygen permeability of 0.01 cc to 5.0 cc·20 μm/(m²·day·atm) at a temperature of 23° C. and a humidity of 65%.

BRIEF DESCRIPTION OF THE DRAWING

The invention will be described with reference to the accompanying drawing, wherein like numbers reference like elements.

FIGURE is an exploded perspective view showing an example of a storage body of the invention.

DESCRIPTION OF EXEMPLARY EMBODIMENTS

Hereinafter, an embodiment of the invention (hereinafter, referred to as "present embodiment") will be described in detail with reference to the drawing as necessary, but the invention is not limited thereto. Various modifications can be made within the scope not departing from the gist thereof. In the drawing, the same elements are given the same reference numerals, and duplicate description thereof will not be repeated. In addition, the positional relations such as top, bottom, left, and right is based on the positional relations shown in the drawing unless otherwise specified. Further, the ratio of the dimensions of the drawing is not limited to the ratio shown in the drawing. Moreover, in the present specification, "(meth)acryl" means "acryl" and "methacryl" corresponding thereto, and "(meth)acrylate" means "acrylate" and "methacrylate" corresponding thereto.

Ultraviolet-Curable Ink Jet Composition

The ultraviolet-curable composition according to the present embodiment includes a pigment, a pigment dispersant, a polymerizable compound, a photopolymerization initiator, and water, and is stored in an storage body. The content of water included in the composition is 0.05 mass % to 1.0 mass % based on the total amount of the ultraviolet-curable composition. Further, both the acid value and the amine value of the pigment dispersant are 50 mgKOH/g or less, and at least one of the acid value and the amine value thereof is 10 mgKOH/g or more. The ultraviolet-curable composition is preferably a radical-polymerizable ultraviolet-curable composition from the viewpoint of further increasing its curability and obtaining high versatility and high convenience.

In the ultraviolet-curable composition, both the acid value and the amine value of the pigment dispersant are 50 mgKOH/g or less, and the content of water in the ultraviolet-curable composition is 1.0 mass % or less, so that it is possible to suppress the precipitation of foreign matter. The reason for this is presumed that the precipitation of foreign matter is suppressed by setting the content of water and the acid value and amine value of the pigment dispersant in a predetermined value or less, considering the fact that foreign matter is precipitated when a pigment dispersant having an acid value or amine value exists in the case where water content is large. Further, when at least one of the acid value and the amine value of the pigment dispersant is 10 mgKOH/g or more, it is possible to more sufficiently improve the curability of the ultraviolet-curable composition. The reason for this is presumed that the pigment dispersant having such an acid or amine value effectively acts as a catalyst for a curing reaction of a polymerizable compound. Moreover, when the content of water in the ultraviolet-curable composition is 0.05 mass % or more, it is possible to increase the manufacturing efficiency of the ultraviolet-curable composition. Particularly, since the content of water in the ultraviolet-curable composition greatly depends on the content of water contained in (mixed with) the synthesized polymerizable compound, when the content of water in the ultraviolet-curable composition is set to 0.05 mass % or more, it is presumed that the load due to the process of decreasing the content of water present in the polymerizable compound can be reduced. As a result, the shortening of manufacturing time, the simplification of process, and the reduction of labor become possible, thereby reducing a manufacturing cost. However, factors are not limited thereto.

The ultraviolet-curable composition can be used for various applications, its application is not limited. Examples of its application include ink and polymerization forming. Among these, from the viewpoint of more effectively and reliably demonstrating the effects of the invention, the ultraviolet-curable composition is preferably used for ink, and is also preferably used for ink jet. Hereinafter, a case that the ultraviolet-curable composition according to the present embodiment is used as an ink jet ink composition (hereinafter, briefly referred to as "composition") which is a first embodiment of an ink jet composition (composition ejected by an ink jet method and used) will be described in detail, but the ultraviolet-curable composition is not limited thereto.

Polymerizale Compound

The composition contains a polymerizable compound. The polymerizable compound is polymerized by the application of energy such as light irradiation independently or by the action of a polymerization initiator to cure the composition on a recording medium. The polymerizale compound is not particularly limited, but commonly known monofunctional, bi-functional, tri- or more polyfuctional monomers and oligomers can be used as the polymerizable compound. These polymerizable compounds may be used alone or in a combination of two or more thereof. These polymerizable compounds will be exemplified below.

Preferably, the composition contains a radical-polymerizable compound as the polymerizable compound from the viewpoint of further increasing the curability of the composition and obtaining high versatility and high convenience. Further, in addition to or instead of this radical-polymerizable compound, preferably, the composition contains a polymerizable compound having a vinyl ether group and a (meth)acrylate group as the polymerizable compound from the viewpoint of increasing curability, lowering the viscosity of the composition and increasing the solubility of a polymerization initiator when using the polymerization initiator. The polymerizable compound having a vinyl ether group and a (meth)acrylate group is preferably a radical-polymerizable compound having a vinyl ether group and a (meth)acrylate group. As such a polymerizable compound, for example, monofunctional or polyfuctional (meth)acrylate having a vinyl ether group is exemplified. From the same viewpoint as above, these plymerizable compounds are preferable.

The monofunctional (meth)acrylate having a vinyl ether group is not particularly limited, but, from the viewpoint of lowering the viscosity of the composition, flash point being high, and further increasing the curability of the composition, is preferably a (meth)acrylic acid ester containing a vinyl ether group represented by General Formula (1) below:

$$CH_2=CR^1-COOR^2-O-CH=CH-R^3 \qquad (1).$$

In Formula (1), $R^1$ is a hydrogen atom or a methyl group, $R^2$ is a divalent organic residue of 2 to 20 carbon atoms, and $R^3$ is a hydrogen atom or a monovalent organic residue of 1 to 11 carbon atoms.

Examples of the (meth)acrylic acid ester containing a vinyl ether group, represented by General Formula (1) above, include 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2- vinyloxypropyl (meth)acrylate, 2-vinyloxybutyl (meth) acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth) acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy) ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy) ethyl (meth)acrylate, 2-(vinyloxyisopropoxyethoxy)ethyl (meth)acrylate, 2-(vinyloxyisopropoxyisopropoxy)ethyl (meth)acrylate, 2-(vinylethoxyethoxy)propyl (meth)acrylate, 2-(vinyloxyethoxyisopropoxy)propyl (meth)acrylate, 2-(vinyloxyisopropoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, and 2-(vinyloxyethoxyethoxyethoxy)ethyl (meth) acrylate. They are used alone or in a combination of two or more thereof.

Among these, from the same viewpoint as above, 2-(vinyloxyethoxy)ethyl (meth)acrylate, that is, at least one of 2-(vinyloxyethoxy)ethyl acrylate and 2-(vinyloxyethoxy) ethyl methacrylate is preferable, and 2-(vinyloxyethoxy) ethyl acrylate is more preferable. Since both 2-(vinyloxyethoxy)ethyl acrylate and 2-(vinyloxyethoxy)ethyl methacrylate have a simple structure, the molecular weight thereof is small, and thus it is possible to remarkably lower the viscosity of the composition. Examples of 2-(vinyloxyethoxy)ethyl (meth)acrylate include 2-(2-vinyloxyethoxy) ethyl (meth)acrylate and 2-(1-vinyloxyethoxy)ethyl (meth) acrylate, and examples of 2-(vinyloxyethoxy)ethyl acrylate include 2-(2-vinyloxyethoxy)ethyl acrylate and 2-(1-vinyloxyethoxy)ethyl acrylate. Here, 2-(vinyloxyethoxy)ethyl acrylate is superior to 2-(vinyloxyethoxy)ethyl methacrylate in terms of curability.

The content of the polymerizable compound having a vinyl ether group and a (meth)acrylate group is preferably 10 mass % to 70 mass %, more preferably 10 mass % to 60 mass %, and still more preferably 10 mass % to 50 mass %, based on the total amount (100 mass %) of the composition. When the content thereof is 10 mass % or more, the viscosity of the composition can be lowered, and the curability of the composition tends to be more excellent. Meanwhile, when content thereof is 70 mass % or less, the storage stability of the composition is more excellent, and the surface glossiness of a print tends to be more excellent.

The composition may contain one or more monofunctional, bifunctional, and tri- or higher polyfunctional monomers other than those exemplified above. The monomer is not particularly limited, but examples thereof include unsaturated carboxylic acids, such as (meth)acrylic acid, itaconic acid, crotonic acid, isocrotonic acid, and maleic acid; salts of these unsaturated carboxylic acids; esters of unsaturated carboxylic acids, urethanes, amides, and anhydrides; and acrylonitrile, styrene, various unsaturated polyesters, unsaturated polyethers, unsaturated polyamides, and unsaturated urethanes.

The monofunctional, bifunctional and tri- or higher polyfunctional oligomer is not particularly limited, but examples thereof include an oligomer made from the monomer, such as a straight-chain acrylic oligomer, epoxy (meth)acrylate, oxetane (meth)acrylate, aliphatic urethane (meth)acrylate, aromatic urethane (meth)acrylate, and polyester (meth)acrylate.

The composition may contain an N-vinyl compound as another monofunctional monomer or polyfunctional monomer. The N-vinyl compound is not particularly limited, but examples thereof include N-vinyl formamide, N-vinyl carbazole, N-vinyl acetamide, N-vinyl pyrrolidone, N-vinyl caprolactam, acryloyl morpholine, and derivatives thereof.

The composition may contain monofunctional (meth) acrylate as the monofunctional monomer. In this case, the viscosity of the composition becomes low, the solubility of a photopolymerization initiator and other additives is excellent, and ejection stability is excellent at the time of ink jet recording. The monofunctional (meth)acrylate is not particularly limited, but examples thereof include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyldiglycol (meth)acrylate, 2-hydroxybutyl (meth)acrylate, butoxyethyl (meth)acrylate, ethoxy diethylene glycol (meth) acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth) acrylate, 2-hydroxy-3-phenoxypropyl (meth)acrylate, lactone-modified flexible (meth)acrylate, t-butyl cyclohexyl (meth)acrylate, dicyclopentanyl (meth)acrylate, dicyclopentenyloxyethyl (meth)acrylate, 2-(isopropenoxyethoxy)ethyl (meth)acrylate, 2-(isopropenoxyethoxyethoxy)ethyl (meth) acrylate, 2-(isopropenoxyethoxyethoxyethoxy)ethyl (meth) acrylate, 2-(isopropenoxyethoxyethoxyethoxyethoxy)ethyl (meth)acrylate, polyethylene glycol monovinyl ether (meth) acrylate, and polypropylene glycol monovinyl ether (meth) acrylate. Among these, phenoxyethyl (meth)acrylate is preferable.

The content of the monofunctional monomer is preferably 10 mass % to 60 mass %, and more preferably 20 mass % to 50 mass %, based on the total amount (100 mass %) of the composition. When the content thereof is within the above preferable range, curability, initiator solubility, storage stability, and ejection stability tend to be more excellent.

The composition may contain polyfunctional (meth)acrylate as the polyfunctional monomer. Among them, bifunctional (meth)acrylate is not particularly limited, but examples thereof include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, polytetramethylene glycol di(meth) acrylate, diethylene glycol di(meth)acrylate, and triethylene glycol di(meth)acrylate.

Further, examples of tri- or higher functional (meth) acylates include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

Among these, dipropylene glycol di(meth)acrylate, tripropylene glycol di(meth)acrylate, diethylene glycol di(meth) acrylate, triethylene glycol di(meth)acrylate, and pentaerythritol tri(meth)acrylate are preferable, and dipropylene glycol di(meth)acrylate and pentaerythritol tri(meth)acrylate are more preferable.

The content of the polyfunctional monomer is preferably 5 mass % to 60 mass %, more preferably 10 mass % to 50 mass %, and still more preferably 15 mass % to 40 mass %, based on the total amount (100 mass %) of the composition. When the content thereof is within the above preferable range, curability, storage stability, ejection stability, and the surface glossiness of a print tend to be more excellent.

In addition, in order to increase the toughness, heat resistance and chemical resistance of a cured film, it is preferable to use monofunctional (meth)acrylate in combination with 2-functional (meth)acrylate, and it is more preferable to use phenoxyethyl (meth)acrylate in combination with dipropylene glycol di(meth)acrylate.

The content of the polymerizable compound is preferably 35 mass % to 95 mass %, and more preferably 45 mass % to 90 mass %, based on the total amount (100 mass %) of the composition. When the content of the polymerizable compound is within the above preferable range, it is possible to further reduce viscosity and odor, and it is possible to further improve the solubility and reactivity of a polymerization initiator and the surface glossiness of a print.

Pigment

The composition contains a pigment as a color material. For example, the pigment includes an inorganic pigment and an organic pigment. The inorganic pigment is not particularly limited, but examples thereof include carbon blacks (C.I. pigment black 7) such as furnace black, lamp black, acetylene black and channel black, iron oxides, and titanium oxides.

The organic pigment is not particularly limited, but examples thereof include quinacridone-based pigment, quinacridonequinone-based pigment, dioxazine-based pigment, phthalocyanine-based pigment, anthrapyrimidine-based pigment, anthanthrone-based pigment, indanthrone-based pigment, flavanthrone-based pigment, perylene-based pigment, diketopyrrolopyrrole-based pigment, perinone-based pigment, quinophthalone-based pigment, anthraquinone-based pigment, thioindigo-based pigment, benzimidazolone-based pigment, and isoindolinone-based pigment, azomethine-based pigment, and azo-based pigment.

The pigment may be used alone or in a combination of two or more thereof.

The content of the pigment is preferably 0.1 mass % to 20 mass %, more preferably 0.5 mass % to 10 mass %, and still more preferably 1.0 mass % to 5.0 mass %, based on the total amount (100 mass %) of the composition. When the content of the pigment is within the above preferable range, color developing properties tend to be more excellent.

Pigment Dispersant

The composition contains at least one pigment dispersant in order to make pigment dispersability better. The pigment dispersant is not particularly limited except for the acid value and amine value to be described later, but examples thereof include dispersants generally used in preparing a pigment dispersion such as a polymer dispersant. Specific examples thereof include pigment dispersant containing one or more selected from among polyoxyalkylene polyalkylene polyamine, vinyl-based polymers and copolymers, acrylic polymers and copolymers, polyesters, polyamides, polyimides, polyurethanes, amino-based polymer, silicon-containing polymers, sulfur-containing polymers, fluorine-containing polymers, and epoxy resins as main components. Commercially available products of polymer dispersants include AJSPAR series manufactured by Ajinomoto Fine-Tech Co., Inc., SOLSPERSE series commercially available from Lubrizol Corporation (for example, "Solsperse 36000"), DISPERBYK series manufactured by BYK Chemie Corporation, and DISPARLON series manufactured by Kusumoto Chemicals, Ltd.

In the composition of the present embodiment, from the viewpoint of improving the curability of the composition and the dispersion stability of a pigment, at least one of the acid value and the amine value of the pigment dispersant is 10 mgKOH/g or more. Further, from the viewpoint of suppressing the polymerization gelation of the composition, both the acid value and the amine value of the pigment dispersant are 50 mgKOH/g or less. Since the dispersant having a high acid value or amine value effectively acts as a catalyst for a polymerization reaction (curing reaction) of a polymerizable compound, particularly, a radical-polymerizable compound, it is considered that the curability of the composition is improved, and the dispersion stability of a pigment is improved by the influence of its polarity. Meanwhile, Since the dispersant having a high acid value or amine value effectively acts as a catalyst for a polymerization reaction (curing reaction) of a polymerizable compound, particularly, a radical-polymerizable compound, it is considered that polymerization gelation (thickening) is caused, and the storage stability of the composition tends to be deteriorated. At least one of the acid value and amine value of the pigment dispersant is preferable in terms of the above-described points in order of 15 mgKOH/g or more and 20 mgKOH/g or more and in order of 45 mgKOH/g or less, 40 mgKOH/g or less and 30 mgKOH/g or less.

From the view point of improving the curability of the composition and the dispersion stability of a pigment, the total amount of the acid value and the amine value of the pigment dispersant are preferable in terms of the above-described points in order of 10 mgKOH/g or more, 15 mgKOH/g or more, 20 mgKOH/g or more, and 30 mgKOH/g or more and in order of 100 mgKOH/g or less, 90 mgKOH/g or less, 85 mgKOH/g or less, and 82 mgKOH/g or less.

The acid value and amine value of the pigment dispersant can be determined by potentiometric titration. A plurality of kinds of pigment dispersants may be added to the composition. Even in this case, the acid value and amine value of each of the pigment dispersants may not satisfy the range specified in the present invention. Thus, the pigment dispersant whose measured acid value and amine value are within the above range may be selected and used in preparing the composition.

Water

The composition according to the present embodiment contains water. The content of water is 0.05 mass % to 1.0 mass %, based on the total amount (100 mass %) of the composition. From the viewpoint of further increasing the manufacturing efficiency of the composition and the viewpoint of further increasing the storage stability of the composition when the composition contains a polymerizable compound having a vinyl ether group and a (meth)acrylate group, the content of water is preferably 0.05 mass % or more, more preferably 0.1 mass % or more, and still more preferably 0.15 mass % or more. The reason for this is that water also has a function of inhibiting the polymerization of the polymerizable compound having a vinyl ether group and a (meth)acrylate group. In addition, from the viewpoint of suppressing the deterioration of the curability of the composition and the viewpoint of suppressing the precipitation of foreign matter, the content of water is preferably 1.0 mass % or less, more preferably 0.8 mass % or less, and still more preferably 0.5 mass % or less. As described above, water has a function of inhibiting the polymerization of the polymerizable compound having a vinyl ether group and a (meth) acrylate group, and tends to deteriorate the curability of the composition. In addition, it is considered that water causes the aggregation of a pigment, and foreign matter is precipitated by the aggregation of the pigment.

Examples of the method of adjusting the content of water in the composition include a method of reducing the content of water in each of the components (for example, a polymerizable compound) of the composition, a method of removing water from the composition, and a method of reducing the content of water mixed at the time of preparing the composition. Among these, specific examples of the method of reducing the content of water in a polymerizable compound include a method of distilling and purifying a polymerizable compound, a method of penetrating a polymerizable compound into a semi-permeable membrane selectively transmitting water, and a method of selectively adsorbing water using a water adsorbent adsorbing water. Among these, from the viewpoint of more efficiently and reliably reducing the content of water, the method of distilling and purifying a polymerizable compound is preferable. Water content is measured according to the method described in Examples below.

Examples of water include pure water such as ion exchange water, ultrafiltration water, reverse osmosis water, and distilled water, and ultrapure water obtained by removing ionic impurities as much as possible. Meanwhile, when water sterilized by ultraviolet irradiation or addition of hydrogen peroxide is used, it is possible to prevent the occurrence of molds and bacteria in the case of storing ink for a long period of time. Thus, storage stability tends to be further improved.

The composition according to the present embodiment may also contain any component that can be used in the UV-curable ink jet ink composition in the related art, in addition to each of the components described above. Examples of any component include a polymerization initiator, a color material such as pigment or dye, a dispersant, a polymerization inhibitor, a surfactant, a penetrant, a moisturizer, a solubilizer, a viscosity modifier, a pH adjuster, an antioxidant, a preservative, a fungicide, a corrosion inhibitor, a chelating agent for capturing metal ions influencing dispersion, other additives, and a solvent. These components may be used alone or in a combination of two or more thereof.

Polymerization Initiator

The composition according to the present embodiment may contain a polymerization initiator. The polymerization initiator may be used without limitation as long as it produces active species such as radicals and cations due to thermal energy or light energy such as ultraviolet light and initiates the polymerization of the above-mentioned polymerizable compound. As the polymerization initiator, a photopolymerization initiator or a photo-radical polymerization initiator is preferable. The photo-radical polymerization initiator is not particularly limited, but an acylphosphine oxide-based photopolymerization initiator and a thioxanthone-based photopolymerization initiators are preferable, and an acylphosphine oxide-based photopolymerization initiator is more preferable.

Acylphosphine Oxide-Based Photopolymerization Initiator

The composition preferably contains an acylphosphine oxide-based photopolymerization initiator. The acylphosphine oxide-based photopolymerization initiator is easily affected by oxygen inhibition, but is suitable for curing with an LED emitting long-wavelength light. In addition, the acylphosphine oxide-based photopolymerization initiator can be more easily dissolved in the composition when the content of water in the composition is 1.0 mass % or less based on the total amount of the composition.

The acylphosphine oxide-based photopolymerization initiator is not particularly limited, but specific examples thereof include bis(2,4,6-trimethylbenzoyl)-phenylphosphine oxide, 2,4,6-trimethylbenzoyl-diphenyl-phosphine oxide, and bis-(2,6-dimethoxybenzoyl)-2,4,4-trimethylpentylphosphine oxide.

Commercially available products of the acylphosphine oxide-based photopolymerization initiator are not particularly limited, but examples thereof include IRGACURE 819 (trade name of BASF Corporation, bis(2,4,6-trimethylbenzoyl)-phenyl-phosphine oxide), SPEEDCURE TPO (trade name of Lambson Corporation, 2,4,6-trimethyl benzoyl-diphenyl-phosphine oxide), DAROCUR TPO (trade name of BASF Corporation, 2,4,6-trimethyl benzoyl-diphenyl-phosphine oxide), and SPEEDCURE TPO-L (trade name of Lambson Corporation, ethyl-(2,4,6-trimethyl benzoyl)phenylphosphine oxide).

The content of the acylphosphine oxide-based photopolymerization initiator is preferably 3 mass % to 20 mass % based on the total amount (100 mass %) of the composition. When the content thereof is 3.0 mass % or more, curability tends to be excellent. From the same point of view, the content of the acylphosphine oxide-based photopolymerization initiator is more preferably 4 mass % or more, and still more preferably 7 mass % or more. In addition, when the content thereof is 20 mass % or less, the dissolution and storage stability of solids are maintained good, and thus reliability tends to be excellent. From the same point of view, the content of the acylphosphine oxide-based photopolymerization initiator is more preferably 15 mass % or less, and still more preferably 13 mass % or less.

Thioxanthone-Based Photopolymerization Initiator

The composition may contain a thioxanthone-based photopolymerization initiator. When the composition contains the thioxanthone-based photopolymerization initiator, surface tackiness can be reduced, and, particularly, at the time of formation of a thin film easily affected by oxygen inhibition, the surface of ink is cured, thereby preventing the color mixing and exudation among dots. In addition, when both the acylphosphine oxide-based photopolymerization initiator and the thioxanthone-based photopolymerization initiator are used, the curing process using UV-LED become easier, and the curability and adhesiveness of the composition tends to be further improved, and thus which is preferable.

The thioxanthone-based photopolymerization initiator is not particularly limited. However, specifically, it is preferable that the thioxanthone-based photopolymerization initiator include one or more selected from the group consisting of thioxanthone, diethyl thioxanthone, isopropyl thioxanthone, and chlorothioxanthone. Meanwhile, although not particularly limited, it is preferable that 2,4-diethyl thioxanthone be used as the diethyl thioxanthone, 2-isopropyl thioxanthone be used as the isopropyl thioxanthone, and 2-chlorothioxanthone be used as the chlorothioxanthone. When the composition containing this thioxanthone-based photopolymerization initiator is used, this composition tends to be more excellent in curability, storage stability, and ejection stability. Among these, the thioxanthone-based photopolymerization initiator containing diethyl thioxanthone is preferable. When the thioxanthone-based photopolymerization initiator contains diethyl thioxanthone, ultraviolet light (UV light) in a wide range tends to be able to be more efficiently converted into active species.

Commercially available products of the thioxanthone-based photopolymerization initiator are not particularly limited, but specific examples thereof include SPEEDCURE DETX (2,4-diethyl thioxanthone), SPEEDCURE ITX (2-isopropyl thioxanthone), SPEEDCURE CTX (2-chlorothioxanthone), and SPEEDCURE CPTX (1-chloro-4-propyl thioxanthone) (hereinbefore, manufactured by Lambson Ltd.), and KAYACURE DETX-S(2,4-diethyl thioxanthone) (manufactured by Nippon Kayaku Co., Ltd.).

The content of the thioxanthone-based photopolymerization initiator is preferably 0.5 mass % to 5.0 mass %, and more preferably 1.0 mass % to 4.0 mass %, based on the total amount (100 mass %) of the composition. When the content thereof is 0.5 mass % or more, surface tackiness can be reduced, and, at the time of formation of a thin film easily affected by oxygen inhibition, the surface of ink is cured, thereby preventing the color mixing and exudation among dots. In addition, when the content thereof is 5.0 mass % or less, the coloring of ink by the initiator itself slightly occurs, and thus the yellowing of color slightly occur, and the adhesiveness of a cured film tends to be more excellent.

Other Photopolymerization Initiators

The composition may further contain one or more of radical photopolymerization initiators and cationic photopolymerization initiators other than the above photopolymerization initiators. Examples of other radical photopolymerization initiators include aromatic ketones, aromatic onium salt compounds, organic peroxides, thio compounds (such as thiophenyl group-containing compounds), α-aminoalkylphenone compounds, hexaarylbiimidazole compounds, ketoxime ester compounds, borate compounds, azinium compounds, metallocene compounds, active ester compounds, compounds having a carbon-halogen bond, and an alkylamine compounds.

Commercially available products of other radical photopolymerization initiators are not particularly limited, but examples thereof include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), IRGACURE 784 (bis(η5-2,4-cyclopentadiene-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazole-3-yl]-, 1-(O-acetyloxime)), IRGACURE 754 (a mixture of oxyphenyl acetate and 2-[2-oxo-2-phenylacetoxyethoxy]ethyl ester and a mixture of oxyphenyl acetate and 2-(2-hydroxyethoxy)ethyl ester) (hereinbefore, manufactured by BASF Corporation), SPEEDCURE TPO (manufactured by Lambson Ltd.), LUCIRIN TPO, LR8893, and LR8970 (hereinbefore, manufactured by BASF Corporation), and UBECYL P36 (manufactured by UCB Corporation).

Other cationic photopolymerization initiators are not particularly limited, but specific examples thereof include sulfonium salts and iodonium salts.

The content of the photopolymerization initiator is preferably 5 mass % to 20 mass % based on 100 mass % of the composition. When the content thereof is within the above range, a sufficient ultraviolet curing rate can be exhibited, and the undissolved residue of the photopolymerization initiator or the coloration derived from the photopolymerization initiator can be avoided.

Polymerization Inhibitor

The composition may contain at least one polymerization inhibitor from the viewpoint of further improving storage stability thereof. The polymerization inhibitor is not particularly limited, but examples thereof include hindered amine compounds, such as a compound having a 2,2,6,6-tetramethylpiperidine-N-oxyl skeleton, a compound having a 2,2,6,6-tetramethylpiperidine skeleton, a compound having a 2,2,6,6-tetramethylpiperidine-N-alkyl skeleton, and a compound having a 2,2,6,6-tetramethylpiperidine-N-acyl skeleton; and p-methoxy phenol, hydroquinone monomethyl ether (MEHQ), hydroquinone, cresol, t-butyl catechol, 3,5-di-t-butyl-4-hydroxytoluene, 2,2'-methylene-bis(4-methyl-6-t-butylphenol), 2,2'-methylene-bis(4-ethyl-6-butylphenol), and 4,4'-thio-bis(3-methyl-6-t-butylphenol).

The ultraviolet-curable composition according to the present embodiment is stored in a storage body. In other words, the storage body according to the present embodiment stores the ultraviolet-curable composition according to the present embodiment. Hereinafter, a case of using an ultraviolet curable composition as an ink jet ink composition will be described in detail.

Storage Body

An aspect of the invention provides an ink storage body storing a non-aqueous ink composition. In the present specification, the "storage body" is a concept including a container and a package, and refers to a thing that directly or indirectly stores an ink composition. That is, the storage body is configured such that a container is filled with an ultraviolet-curable composition, or is configured such that a container filled with at least an ultraviolet-curable composition is sealed by a package made of a member. The ink storage body is used in storing and transporting an ink composition before the ink composition is used by a recording apparatus, and the ink composition stored in the ink storage body is supplied to a recording apparatus during using the ink composition.

Aspects of the ink storage body are not limited, but examples thereof include an ink cartridge, a pack, a bottle, a tank, a jar, and a can. Among these, from the viewpoint of being widely used and easily controlling water permeability and oxygen permeability, which will be described later, in a desired value, an ink cartridge, a pack, bottle, and tank are preferable, and a pack is more preferable.

FIGURE is an exploded perspective view showing an example of an ink storage body according the present embodiment. An ink cartridge 40 includes an ink pack 70 filled with ink, and a cartridge case 72 composed of a case body 76 and a cover 78 covering and protecting the ink pack 70. The ink pack 70 has an ink supply inlet 74. The case body 76 has a notch 80 and grooves 86, and the cover 78 has a holder 82 and hooks 84. In the ink cartridge 40, the ink pack 70 is put into the case body 76 and the cover 78, and, at this time, the ink supply inlet 74 is fitted in the notch 80 and sandwiched between the holder 82 and the notch 80 to fix the ink pack 70. Further, the case body 76 and the cover 78 are sealed by fitting the hooks 84 into the grooves 86. Here, the ink pack 70 and the cartridge case 72 corresponds to the "ink storage body" according to the present embodiment. Further, in the ink storage body, a structure for directly storing the ink composition, such as the ink pack 70, is referred to as a container. The ink storage body may be an ink storage body which is composed of only the container, for example, an ink storage body in which the container itself is a storage body. In addition, the ink storage body may be equipped with an package (not shown). The package may cover and seal at least the container, may cover the entire container, and may cover at least the container to be provided in the storage body. The storage body may consist of a container and a package.

The application mode of the ink storage body is not particularly limited, but examples thereof include: (A) a cartridge type storage body, in which the ink storage body, which is not integrated with the recording apparatus, is mounted in an recording apparatus, and then an ink composition is supplied from the ink storage body to the recording apparatus; (B) a bottle type storage body, in which an ink composition is supplied from the ink storage body, which is not integrated with the recording apparatus, to an ink tank of an recording apparatus; and (C) in which the ink storage body is previously equipped as a part of an recording apparatus. Here, in the case of (A) and (C), an ink composition is supplied to a head of a recording apparatus from the mounted or equipped ink storage body through a connecting unit such as an ink tube, thereby performing recording. Further, in the case of (B), an ink composition is transferred to an ink tank of an recording apparatus from the ink storage body, and then this ink composition is supplied to the head of the recording apparatus from the ink tank through a connecting unit such as an ink tube, thereby performing recording.

The material of a member constituting the container, such as the ink pack 70, or the package is not particularly limited, but examples thereof include resins such as polyethylene terephthalate (PET), polypropylene, polyethylene, ethylene vinyl acetate copolymers, ethylene vinyl alcohol copolymers (EVOH), and polystyrene; inorganic materials such as glass. Here, the constituent materials may be used in a combination thereof at an appropriate ratio, and may also be repeatedly used in a plurality of kinds.

The constituent member is preferably a film in terms of flexibility and weight saving. The material of the member, as a film material having good durability, is not particularly limited, but examples thereof include plastic films, such as polyethylene terephthalate (PET), polyethylene, polypropylene, ethylene vinyl acetate copolymers, ethylene vinyl alcohol copolymers, and polystyrene. Among these, high-density, low-density or linear low-density polyethylene, polypropylene, ethylene vinyl acetate copolymers, ethylene vinyl alcohol copolymers, and polystyrene are preferable. The film material may be a laminated film, and may also be a stretched film.

The oxygen permeability of the member of a container of the ink storage body or a package covering and sealing the container at a temperature of 23° C. and a humidity of 65% is 0.01 cc·20 μm/(m²·day·atm) to 5.0 cc·20 μm/(m²·day·atm). When the oxygen permeability thereof is 0.01 cc·20 μm/(m²·day·atm) or more, it is preferable in terms of degree of freedom of design of the member, and it is possible to suppress the polymerization gelation of the composition during storage. When the oxygen permeability thereof is 5.0 cc·20 μm/(m²·day·atm) or less, the amount of dissolved oxygen in the composition during storage tends to be hardly changed, and the ejection stability of the composition tends to be improved. Here, oxygen permeability can be measured by the method prescribed in JIS K 7126 (ISO 15105).

In order to improve the oxygen permeability, the ink storage body may have a gas barrier layer. The gas barrier layer is not particularly limited, but examples thereof include a metal layer, such as an aluminum layer, and an organic layer, such as an ethylene vinyl alcohol copolymer layer or a polyvinyl alcohol layer.

The total thickness of the member is preferably 10 μm or more, more preferably 20 μm or more, still more preferably 30 μm or more, further preferably 40 μm or more, and still further preferably 70 μm or more. When the total thickness thereof is 10 μm or more, the content of water in the stored ink composition and the amount of dissolved oxygen in the composition are hardly changed, and thus the strength of the ink storage body tends to be improved. In addition, the total thickness of the member is preferably 300 μm or less, more preferably 200 μm or less, and still more preferably 150 μm or less. When the total thickness thereof is 200 μm or less, visibility and flexibility tend to be further improved.

The capacity of the ink storage body capable of storing the ink composition is preferably 100 mL to 3,000 mL, more preferably 100 mL to 2,000 mL, still more preferably 100 mL to 1,000 mL, particularly preferably 100 mL to 800 mL, and more particularly preferably 200 mL to 800 mL. When the capacity of the ink storage body is within the above range, there are advantageous effects in that, while the amount of dissolved oxygen in the ink of the ink storage body does not almost change after the start of use of the ink storage body, it is possible to use up the ink composition, and the amount of dissolved oxygen in the ink composition during storage hardly change.

The water permeability of the member is preferably 20 g/m²·24 hours or less, more preferably 10 g/m²·24 hours or less, and still more preferably 5.0 g/m²·24 hours or less. When the water permeability thereof is 20 g/m²·24 hours or less, the content of water in the stored composition tends to be difficult to increase, and the particle diameter of a pigment is difficult to change, and the occurrence of foreign matter is suppressed, and thus the long-term storage stability of the composition tends to be further improved. In addition, the water permeability of the ink storage body is not particularly limited, but, in terms of degree of freedom of design, is preferably 0.10 g/m²·24 hours or more, more preferably 0.20 g/m²·24 hours or more, still more preferably 1.0 g/m²·24 hours or more, and further more preferably 2.0 g/m²·24 hours or more. Here, water permeability can be measured by gas chromatography.

As described above, according to the present embodiment, there can be provided a storage body that stores an ultraviolet-curable composition having excellent curability, capable of suppressing the precipitation of foreign matter and having high manufacturing efficiency.

The ink jet apparatus according to the present embodiment is an apparatus including an ink jet head ejecting an ink jet composition by an ink jet method using the ink jet composition and the storage body storing this ink jet composition, and the ink jet method according to the present embodiment includes an ejection process of ejecting this composition from the ink jet head. The ink jet method may include a curing process of curing the composition ejected and adhered to an object by ultraviolet irradiation, and may also include a irradiation apparatus for performing the curing process. In the irradiation process, as an ultraviolet light source, a metal halide lamp, a mercury lamp, or an ultraviolet-emitting diode is preferably used, and, in terms of saving size and power, an ultraviolet-emitting diode is more preferably used. As the ultraviolet-emitting diode, an ultraviolet-emitting diode having an emission peak wavelength of 360 nm to 420 nm is preferable in terms of easy availability. The irradiation energy in the curing process, in terms of shortening cure process time by sufficiently curing the composition, is preferably 100 mJ/cm$^2$ to 1000 mJ/cm$^2$, and more preferably in order of 800 mJ/cm$^2$ or less and 600 mJ/cm$^2$ or less and in order of 200 mJ/cm$^2$ or more and 300 mJ/cm$^2$ or more. In the ink jet method and ink jet apparatus, configurations other than the above configurations are not particularly limited. For example, configurations known in the art may be used as other configurations. According to the ink jet apparatus and ink jet method of the present embodiment, the curability of the ink jet composition is excellent, and the precipitation of foreign matter in the composition can be suppressed, and thus ejection stability also becomes excellent. Particularly, when the composition contains a polymerizable compound having a vinyl ether group and a (meth)acrylate group, storage stability becomes excellent in spite of this composition being cured by ultraviolet irradiation. In addition, when the composition contains a polymerizable compound having a vinyl ether group, the viscosity of this composition can be lowered, so that, from this point of view, it is possible to further increase ejection stability.

EXAMPLES

Hereinafter, the invention will be described in more detail with reference to Examples and Comparative Examples. However, the invention is not limited to Examples below.
Materials for Ultraviolet-Curable Composition
The main materials for the ultraviolet-curable compositions used in Examples and Comparative Examples below are as follows.
Color Material
P.I. pigment blue 15:4
Pigment Dispersant
BYK9076, BYKJET9150, BYK2155, BYK2008, DISPERBYK102, ANTI-TERRA U100 (trade name of BYK Japan Corporation), AJISPER PB881, AJISPER PN411 (trade name of Ajinomoto Fine-Techno Co., Ltd.)
Polymerizable Compound
VEEA (2-(2-vinyloxyethoxy)ethyl acrylate, manufactured by Nippon Shokubai Ltd., number of functional groups: 1) PEA (phenoxyethyl acrylate, manufactured by Osaka Organic Chemical Industry Co., Ltd., number of functional groups: 1) DPGDA (dipropylene glycol diacrylate, manufactured by Sartomer Co., Ltd., number of functional groups: 2) SR444 (pentaerythritol triacrylate, manufactured by Nippon Kayaku Co., Ltd., number of functional groups: 3)
Polymerization Inhibitor
MEHQ (hydroquinone monomethyl ether, manufactured by Tokyo Chemical Industry Co., Ltd.)
Polymerization Initiator
IRGACURE TPO (trade name of BASF Corporation, solid content 100 mass %)
IRGACURE 369 (trade name of BASF Corporation, solid content 100 mass %)
KAYACURE DETX (trade name of Nippon Kayaku Co., Ltd., solid content 100 mass %)

Examples 1 to 25 and Comparative Examples 1 to 11

Preparation of Ultraviolet-Curable Composition

Materials were respectively mixed in composition ratios (mass %) shown in Tables 1 and 2 below to prepare compositions. First, among the materials, PEA, a pigment, and a pigment dispersant were mixed, and sufficiently stirred to disperse the pigment, and then the remaining materials were mixed, and sufficiently stirred to obtain each composition (ultraviolet-curable composition). Here, water content was adjusted to the values shown in Tables 1 and 2 by respectively using polymerizable compounds after distilling and purifying each of the polymerizable compounds used in Examples and Comparative Examples one time or a plurality of times, or by adding ion exchange water to the composition. Next, a laminate film obtained by laminating an aluminum-deposited film on a high-density polyethylene film (thickness: 100 μm) overlapped the outer side of the aluminum-deposited film (thickness: 10 μm), and heat welding was performed therearound to fabricate a pack as a container. The container was filled with each of the prepared compositions in a capacity of 700 ml, was sealed to block air, and was then put into a protective case to make a composition storage body. Examples 20 to 25 were different from other Examples in thickness of the aluminum-deposited film of the laminated film.

TABLE 1

| | Ex. 1 | Ex. 21 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|---|---|---|---|---|
| P.I pigment blue 15:4 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| BYK9076 | 1.0 | | | | 1.0 | | | | | | | | | | | | | | |
| AJISPER PB881 | | 1.0 | | | | | | | | | | | | | | | | | |
| BYKJET9150 | | | 1.0 | | | | 1.0 | | | | | | | | 1.0 | | | | |
| ANTI-TERRA U100 | | | | 1.0 | | 1.0 | | | 1.0 | 1.0 | | | | 1.0 | | | 1.0 | | |
| BYK2155 | | | | | | | | 1.0 | | | 1.0 | | | | | | | | |
| VEEA | 20.0 | 20.0 | 20.0 | 20.0 | 20.0 | 20.0 | 20.0 | 20.0 | 20.0 | 20.0 | 20.0 | 20.0 | 20.0 | 20.0 | 35.0 | 35.0 | 35.0 | 35.0 | 35.0 |
| PEA | 35.0 | 35.0 | 35.0 | 35.0 | 35.0 | 35.0 | 35.0 | 35.0 | 35.0 | 35.0 | 35.0 | 35.0 | 35.0 | 35.0 | 42.0 | 42.0 | 42.0 | 42.0 | 42.0 |
| DPGDA | 22.0 | 22.0 | 22.0 | 22.0 | 22.0 | 22.0 | 22.0 | 22.0 | 22.0 | 22.0 | 22.0 | 22.0 | 22.0 | 22.0 | 7.8 | 7.8 | 7.8 | 7.8 | 7.8 |
| SR444 | 7.8 | 7.8 | 7.8 | 7.8 | 7.8 | 7.8 | 7.8 | 7.8 | 7.8 | 7.8 | 7.8 | 7.8 | 7.8 | 7.8 | 0.2 | 0.2 | 0.2 | 0.2 | 0.2 |
| MEHQ | 0.2 | 0.2 | 0.2 | 0.2 | 0.2 | 0.2 | 0.2 | 0.2 | 0.2 | 0.2 | 0.2 | 0.2 | 0.2 | 0.2 | 4.0 | 4.0 | 4.0 | 4.0 | 4.0 |
| IRGACURE TPO | 4.0 | 4.0 | 4.0 | 4.0 | 4.0 | 4.0 | 4.0 | 4.0 | 4.0 | 4.0 | 4.0 | 4.0 | 8.0 | 4.0 | | | | | |
| IRGACURE 369 | 6.0 | 6.0 | 6.0 | 6.0 | 6.0 | 6.0 | 6.0 | 6.0 | 6.0 | 6.0 | 6.0 | 6.0 | 2.0 | 6.0 | 6.0 | 6.0 | 6.0 | 6.0 | 6.0 |
| KAYACURE DETX | 2.0 | 2.0 | 2.0 | 2.0 | 2.0 | 2.0 | 2.0 | 2.0 | 2.0 | 2.0 | 2.0 | 2.0 | | 2.0 | 2.0 | 2.0 | 2.0 | 2.0 | 2.0 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Water content | 0.2% | 0.2% | 0.05% | 0.05% | 0.05% | 0.05% | 0.2% | 0.20% | 0.2% | 1.0% | 1.00% | 1.0% | 1.0% | 1.0% | 0.2% | 0.2% | 0.2% | 0.05% | 1.0% |
| Acid value | 38 | 17 | 12 | 48 | 38 | 50 | 12 | 48 | 50 | 12 | | 38 | 38 | 50 | 12 | 38 | 50 | 38 | 38 |
| Amine value | 44 | 17 | 5 | 2 | 44 | 35 | 5 | 2 | 35 | 5 | 48 | 44 | 44 | 35 | 5 | 44 | 35 | 44 | 44 |
| Oxygen permeability | 2 | 2 | 2 | 2 | 2 | 2 | 2 | 2 | 2 | 2 | 2 | 2 | 2 | 2 | 2 | 2 | 2 | 2 | 2 |
| Curability | A | A | A | A | A | A | B | A | A | B | A | B | A | A | C | B | B | B | B |
| Pigment dispersion stability | A | A | A | A | A | A | B | A | A | C | A | B | C | A | B | A | A | A | B |
| Polymerization gelation(thickening) | A | A | B | C | B | C | A | B | B | A | A | A | B | A | A | A | B | A | A |
| Ejection stability | A | A | A | A | A | B | A | B | B | B | A | A | A | B | A | A | A | A | A |
| Dehydration process efficiency | B | B | C | C | C | C | B | B | B | B | B | B | B | B | B | B | B | B | B |

TABLE 2

| | Ex. 20 | Ex. 21 | Ex. 22 | Ex. 23 | Ex. 24 | Ex. 25 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|---|---|---|---|---|
| P.I pigment blue 15:4 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| BYK9076 | 1.0 | | | | 1.0 | | 1.0 | | | | | | | 1.0 | | | |
| AJISPER PB881 | | 1.0 | | | | | | | | | | | | | | | |
| BYKJET9150 | | | 1.0 | | | | | | | | | | | | | | |
| ANTI-TERRA U100 | | | | 1.0 | | 1.0 | | | | | | | | | | | |
| AJISPER PN411 | | | | | | | | 1.0 | | | 1.0 | | | | 1.0 | | |
| DISPERBYK102 | | | | | | | | | 1.0 | | | 1.0 | | | | 1.0 | |
| BYK2008 | | | | | | | | | | 1.0 | | | 1.0 | | | | 1.0 |
| VEEA | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| PEA | 35.0 | 35.0 | 35.0 | 35.0 | 35.0 | 35.0 | 35.0 | 35.0 | 35.0 | 35.0 | 35.0 | 35.0 | 35.0 | 35.0 | 35.0 | 35.0 | 35.0 |
| DPGDA | 22.0 | 22.0 | 22.0 | 22.0 | 22.0 | 22.0 | 22.0 | 22.0 | 22.0 | 22.0 | 22.0 | 22.0 | 22.0 | 22.0 | 22.0 | 22.0 | 22.0 |
| SR444 | 7.8 | 7.8 | 7.8 | 7.8 | 7.8 | 7.8 | 7.8 | 7.8 | 7.8 | 7.8 | 7.8 | 7.8 | 7.8 | 7.8 | 7.8 | 7.8 | 7.8 |
| MEHQ | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| IRGACURE TPO | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| IRGACURE369 | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 |
| KAYACURE DETX | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Water content | 0.2% | 0.2% | 0.2% | 0.2% | 0.2% | 0.2% | 0.02% | 0.02% | 0.02% | 0.02% | 0.2% | 0.2% | 0.2% | 1.2% | 1.2% | 1.2% | 1.2% |
| Acid value | 12 | 38 | 50 | 12 | 38 | 50 | 38 | 6 | 66 | 101 | 6 | 66 | 101 | 38 | 6 | 66 | 101 |
| Amine value | 5 | 44 | 35 | 5 | 44 | 35 | 44 | 2 | 2 | 2 | 2 | 2 | 2 | 44 | 2 | 2 | 2 |
| Oxygen permeability | 0.01 | 0.01 | 0.01 | 5 | 5 | 5 | 2 | 2 | 2 | 2 | 2 | 2 | 2 | 2 | 2 | 2 | 2 |
| Curability | B | A | A | B | A | A | A | D | A | A | D | A | A | D | E | D | D |
| Pigment dispersion stability | B | A | A | B | A | A | A | D | A | A | D | A | A | D | E | D | D |
| Polymerization gelation (thickening) | B | B | C | A | A | B | D | D | E | E | A | D | D | A | D | D | D |
| Ejection stability | A | A | B | B | B | B | D | D | D | D | D | D | D | D | D | D | D |
| Dehydration process efficiency | B | B | B | B | B | B | D | D | D | D | B | B | B | B | B | B | B |

Measurement of Water Content

The content of water in the ultraviolet-curable composition was measured using a moisture meter (product name "automatic heated and vaporized moisture measuring system AQS-22010", manufactured by Hiranuma Industries Co., Ltd.) by Karl Fischer coulomeric method. The results thereof are shown in Tables 1 and 2 (based on mass).

Measurement of Acid Value and Amine Value

In the acid value and amine value of a pigment dispersant, the acid value thereof was measured by the method described in JIS K 0070, and the amine value thereof was measured by the method described in JIS K 7237. The measurement thereof was performed using AT 610 manufactured by Kyoto Electronics Manufacturing Co., Ltd.

Oxygen Permeability

The oxygen permeability of the film constituting the container used in the composition storage body fabricated with respect to each Example was measured. The oxygen permeability thereof was measured by JIS K 7126 plastic-film and sheet gas permeability test method (gas chromatography) at a temperature of 23° C. and a humidity of 65%. One side (low-pressure side) separated by a test piece was maintained in vacuum, and test gas was introduced into other side (high-pressure side). The amount of the gas having passed through the test piece and then having permeated the low-pressure side at a temperature of 23° C. and a humidity of 65% was measured, thereby calculating gas permeability.

Evaluation of Curability

The ultraviolet-curable composition was applied onto a PET film (PET50A PL [trade name], manufactured by Lintec Corporation) using a bar coater to fabricated to a coating film having a thickness of 14 μm. Thereafter, the coating film was cured by irradiating this coating film with ultraviolet light having an irradiation intensity of 1100 mW/cm$^2$ and a wavelength of 395 nm. The cured coating film (cured film) was rubbed 10 times with 100 g weight using a cotton swab to determine the curing energy (irradiation energy) at the time at which scratches do not adhere any longer.

Here, the irradiation energy [mJ/cm$^2$] was determined by measuring the irradiation intensity [mW/cm$^2$] of the surface irradiated with ultraviolet light from a light source and multiplying the measured irradiation intensity by irradiation duration time. The irradiation intensity was measured using an ultraviolet meter UM-10 and a light receiver UM-400 (all are manufactured by KONICA MINOLTA SENSING, INC.). The following evaluation criteria were set based on the results of irradiation intensity. The results thereof are summarized in Tables 1 and 2.

A: 250 mJ/cm$^2$ or less
B: more than 250 mJ/cm$^2$ and 350 mJ/cm$^2$ or less
C: more than 350 mJ/cm$^2$ and 400 mJ/cm$^2$ or less
D: more than 400 mJ/cm$^2$ Evaluation of Pigment Dispersion Stability (Foreign Matter Precipitation Suppression)

After the ejection for 60 minutes, a filter was taken out from a head, and residues accumulated in the filter was observed with the naked eye, and then pigment dispersion stability was evaluated by the following evaluation criteria. As the filter, a filter of a nominal 2800 mesh was used. The results thereof are summarized in Tables 1 and 2. Here, the generated residues contained at least a pigment. This evaluation is an evaluation related to the generation of foreign matter caused by at least the pigment.

A: residue does not exist.
B: fine residue slightly exists
C: large residue also slightly exists in addition to fine residue.
D: large residue somewhat exists.
E: filter is approximately filled with residue.

Evaluation of Polymerization Gelation(Thickening)

The ultraviolet-curable composition was put into a glass bottle, and then the glass bottle was sealed, and the ultraviolet-curable composition was stored at 60° C. for 2 weeks. The viscosity of the ultraviolet-curable composition at 20° C. before and after storage was measured by a viscometer manufactured by PHYSICA Corporation, and it was calculated what percentage (%) the viscosity of the ultraviolet-curable composition after storage was increased compared to the viscosity of the ultraviolet-curable composition before storage, that is, what percentage (%) the ultraviolet-curable composition was thickened. This evaluation is an evaluation related to the storage stability when the composition was stored for a long period of time. The following evaluation criteria were set based on the results thereof. The results thereof are summarized in Tables 1 to 3.

A: viscosity increase rate is less than 3%
B: viscosity increase rate is 3% to less than 6%
C: viscosity increase rate is 6% to less than 9%
D: viscosity increase rate is 9% to less than 12%
E: viscosity increase rate is 12% or more.

Evaluation of Ejection Stability

A head having 360 nozzles was fixed on the upper portion, a PET film (product number "PET50 K2411 PAT1E", manufactured by Lintec Corporation) was transported below the nozzles of the head at a rate of 15 m/min, the ultraviolet-curable composition was ejected from 180 nozzles to the PET film at a frequency of 10 kHz, and continuous printing was performed. Simultaneously with the printing, the composition adhered to the PET film was irradiated with ultraviolet light using an LED having a light-emitting peak wavelength of 395 nm, thereby forming an image. Whether or not the ultraviolet-curable composition was ejected from all the nozzles was observed with the naked eye every 5 minute from the start of ejection, and then ejection stability was evaluated by the following evaluation criteria. The results thereof are summarized in Tables 1 and 2.

A: there is no nozzle missing for 60 minutes or more
B: there is nozzle missing for 30 minutes to less than 60 minutes
C: there is nozzle missing for 15 minutes to less than 30 minutes
D: there is nozzle missing for less than 15

Evaluation of Dehydration Process Efficiency (Manufacturing Efficiency)

Each of the polymerizable compounds obtained by a generally used method was distilled and purified one time using a rotary evaporator. Each of the ultraviolet-curable compositions having composition ratios shown in Table 1 and 2 was prepared using the distilled and purified VEEA, and the water content thereof was measured. The distillation and purification of the polymerizable compound, the preparation of the ultraviolet-curable composition, and the measurement of the water content were repeated until the measured water content became the value shown in Tables 1 and 2. The dehydration process efficiency (manufacturing efficiency) was evaluated as follows, based on the number of distillation and purification. It is shown in Tables 1 and 2 that the smaller the number of distillation and purification, the higher the dehydration process efficiency (manufacturing efficiency). The results thereof are summarized in Tables 1 and 2.

A: 2 times or less
B: 3 to 4 times
C: 5 times or more

From the results of Examples, it is found that, when water content is 0.05 mass % to 1.0 mass % based on the total amount of the ultraviolet-curable ink jet composition, and when both the acid value and the amine value of the pigment dispersant are 50 mgKOH/g or less and at least one of the acid value and the amine value thereof is 10 mgKOH/g or more, curability and pigment dispersion stability (foreign matter precipitation suppression) are excellent, polymerization gelation is suppressed, ejection stability is excellent, and dehydration process efficiency can be improved.

From comparison of Examples 1, 5, and 12 with Comparative Example 8, it is found that, when water content is 1.0 mass % or less, pigment dispersion stability (foreign matter precipitation suppression) is excellent, and, as a result, ejection stability is excellent, and curability is also excellent. From comparison of Example 1 with Comparative Example 1, it is found that, when water content is 0.05 mass % or more, polymerization gelation (thickening) is suppressed, and, as a result, ejection stability is excellent, and dehydration process efficiency is also improved.

From comparison of Examples 1, 2, 7 to 9, and 15 to 17 with Comparative Example 5, it was found that, when water content is 0.05 mass % to 1.0 mass %, and when at least one of the acid value and the amine value of the pigment dispersant is 10 mgKOH/g or more, pigment dispersion stability (foreign matter precipitation suppression) are excellent, and, as a result, ejection stability is excellent, and curability is also excellent.

In addition, from comparison of Examples 1, 2, 7 to 9, and 15 to 17 with Comparative Examples 6 and 7, it was found that, when water content is 0.05 mass % to 1.0 mass %, and when both the acid value and the amine value of the pigment dispersant are 50 mgKOH/g or less, polymerization gelation (thickening) can be suppressed, and, as a result, ejection stability tends to be excellent.

Further, from Comparative Examples 1 to 4, it was found that, when water content is less than 0.05 mass %, the viscosity of the composition is greatly increased. It is presumed that, when water content is small, the polymerization gelation of the composition cannot be suppressed, and thus the viscosity of the composition is greatly increased. In the case of the compositions of Comparative Examples 1 to 4 in which polymerization gelation (thickening) is poor, it is presumed that a tendency of ejection stability to be also poor is observed, fine gelled products due to polymerization gelation are generated in the composition, and thus ejection stability becomes poor.

Moreover, from Comparative Examples 8 to 11, it was found that, when water content is more than 1.0 mass %, generation of residues was observed, and pigment dispersion stability (foreign matter precipitation suppression) became poor. It is presumed that pigment tends to be easily made into foreign matter due to water. Further, in this case, it was found that curability also became poor. Particularly, in Comparative Example 9, it is presumed that, even when water content is more than 1.0 mass %, the generation of residues in which the precipitation of foreign matter is not easily controlled was observed, in addition to when any one of the acid value and the amine value of the pigment dispersant is not 10 mgKOH/g or more, the generation of residues in which pigment is insufficiently dispersed was observed.

The entire disclosure of Japanese Patent Application No. 2014-082334, filed Apr. 11, 2014 is expressly incorporated by reference herein.

What is claimed is:

1. An ultraviolet-curable ink jet composition, which is stored in a storage body, comprising:
   a pigment;
   a pigment dispersant;
   a polymerizable compound; and
   a photopolymerization initiator,
   wherein water content is 0.05 mass % to 1.0 mass % based on the total amount of the ultraviolet-curable ink jet composition, and
   wherein both the acid value and the amine value of the pigment dispersant are 50 mgKOH/g or less, and at least one of the acid value and the amine value thereof is 10 mgKOH/g or more.

2. The ultraviolet-curable ink jet composition according to claim 1,
   wherein the total amount of the acid value and the amine value of the pigment dispersant are 15 mgKOH/g to 90 mgKOH/g.

3. The ultraviolet-curable ink jet composition according to claim 1,
   wherein the composition comprises a radical polymerizable compound as the polymerizable compound.

4. The ultraviolet-curable ink jet composition according to claim 1,
   wherein the composition comprises an acylphosphine oxide compound as the photopolymerization initiator.

5. The ultraviolet-curable ink jet composition according to claim 1,
   wherein the polymerizable compound having a vinyl ether group and a (meth)acrylate group is included in an amount of 10 mass % to 70 mass % based on the total amount of the ultraviolet-curable ink jet composition.

6. The ultraviolet-curable ink jet composition according to claim 1, further comprising a (meth)acrylic acid ester containing a vinyl ether group, wherein said (meth)acrylic acid ester is 2-(vinyloxyethoxy) ethyl acrylate.

7. A storage body, which stores the ultraviolet-curable ink jet composition according to claim 1.

8. A storage body, which stores the ultraviolet-curable ink jet composition according to claim 2.

9. A storage body, which stores the ultraviolet-curable ink jet composition according to claim 3.

10. A storage body, which stores the ultraviolet-curable ink jet composition according to claim 4.

11. A storage body, which stores the ultraviolet-curable ink jet composition according to claim 5.

12. A storage body, which stores the ultraviolet-curable ink jet composition according to claim 6.

13. The storage body according to 7,
    wherein the storage body is configured such that a container made of a member having an oxygen permeability of 0.01 cc to 5.0 cc·20 $\mu m/(m^2 \cdot day \cdot atm)$ at a temperature of 23° C. and a humidity of 65% is filled with the ultraviolet-curable ink jet composition, or is configured such that a container filled with the ultraviolet-curable ink jet composition is sealed with a package made of a member having an oxygen permeability of 0.01 cc to 5.0 cc·20 $\mu m/(m^2 \cdot day \cdot atm)$ at a temperature of 23° C. and a humidity of 65%.

* * * * *